United States Patent [19]

Van Valkenburg et al.

[11] Patent Number: 4,517,598

[45] Date of Patent: May 14, 1985

[54] METHOD AND APPARATUS FOR ELECTRONIC PUBLISHING

[75] Inventors: George Van Valkenburg, 220 Lake Rd., Takapuna, Auckland, New Zealand; John W. Carlquist, Glendale, Calif.

[73] Assignee: George Van Valkenburg, New Zealand

[21] Appl. No.: 436,005

[22] Filed: Oct. 22, 1982

[51] Int. Cl.³ .................. H04N 7/08; H04N 7/04
[52] U.S. Cl. ................... 358/142; 358/147; 360/14.3; 340/721
[58] Field of Search ........... 358/142, 146, 147, 183; 340/721, 748, 794; 360/14.1, 14.3

[56] References Cited

U.S. PATENT DOCUMENTS

| | | | |
|---|---|---|---|
| 3,514,537 | 5/1970 | Uemura | 360/75.1 |
| 3,594,729 | 7/1971 | Uemura | 340/172.2 |
| 3,632,863 | 1/1972 | Hirashima | 358/142 |
| 3,803,352 | 4/1974 | Goldberger | 360/9.1 |
| 3,891,792 | 6/1975 | Kimura | 358/142 |
| 3,898,644 | 8/1975 | Baxter | 358/142 |
| 4,245,252 | 1/1981 | Nagumo | 358/142 |
| 4,281,345 | 7/1981 | Wärn | 358/147 |
| 4,422,093 | 12/1983 | Pargee, Jr. | 358/12 |
| 4,426,698 | 1/1984 | Pargee, Jr. | 371/37 |
| 4,429,332 | 1/1984 | Pargee, Jr. | 358/143 |

Primary Examiner—Tommy P. Chin
Assistant Examiner—Michael D. Parker
Attorney, Agent, or Firm—Blakely Sokoloff Taylor & Zafman

[57] ABSTRACT

The present invention provides apparatus and methods for formatting and displaying video information having particular application to electronic publishing systems. A video signal which includes a plurality of fields of video information is inputted into an index generator. Alphanumeric characters, which include unique index numbers are generated and inserted into a portion of one or more fields of the video signal. The index numbers and other characters are generated in response to a clock signal, which in the present embodiment, is provided by synchronization signals extracted from the inputted video signal. The index numbers and other characters are advanced, decremented or otherwise modified in response to a control signal which is independent of the frame frequency of the video signal. The control signal may originate from a variety of sources, such as by way of example, switching means operated by a user, an external computer, or a predetermined delay coupled to the synchronization signals. Accordingly, the identical index numbers as well as other characters may be inserted into a plurality of fields of the video signal without regard to the video signal frame frequency. The characters and index numbers may be inserted into a visible portion of the displayed video signal. In addition, the characters and/or numbers may be encoded into the signal in a machine readable form.

14 Claims, 4 Drawing Figures

METHOD AND APPARATUS FOR ELECTRONIC PUBLISHING

BACKGROUND OF THE INVENTION

1. Field

The present invention relates to the field of electronic information dissemination, and more particularly, to apparatus and methods for formatting and displaying video information for use in television electronic publishing systems.

2. Art Background

Over the past 30 years, broad band television has become highly developed on global scale. Thousands of transmitters and millions of receivers are situated world-wide, in urban as well as remote rural settings. In general, television originated as, and has remained, an entertainment medium. However, technological innovation has provided the electronic capability to permit television displays to be utilized in order to access sizable and comprehensive remote data bases. By way of example, these data bases may include information related to stocks, weather, general and technical library services, as well as textual and pictorial representations of current periodicals.

Various systems have been proposed which attempt to provide data base access using television displays to viewers around the globe. A number of these systems are interactive, and permit a user to directly manipulate the accessed data base, by for example, requesting changes, calling for further details, etc. Other systems simply provide the user with the desired information in a fixed and unmodifiable fashion. See, H. J. Hindin, Videotext Looks Brighter As Developments Mount, page 89, *Electronics*, Aug. 5, 1982.

However, prior art television information dissemination systems, such as those described, require the use of hybrid equipment in order to prepare the requisite data for transmission. In addition, prior art television based systems require complex and expensive circuitry, such as encoders and decoders, in order to receive and display the desired video information. Accordingly, there exists a need to provide a system for television based information transfer which will permit the efficient transmission, reception and display of data to a user using simple, reliable and readily available technology.

The present invention provides a means for organizing data and inserting predetermined index numbers and other characters into a video signal, such that unique numbers and/or characters for each "page" of transmitted electronic data may be provided. As will be disclosed, the present invention provides apparatus and methods which permit the reception and display of electronic data base information on a television display using standard video technology.

SUMMARY OF THE INVENTION

The present invention provides apparatus and methods for formatting and displaying video information having particular application to electronic publishing systems. A video signal which includes a plurality of fields of video information is inputted into an index generator. Alphanumeric characters, which include unique index numbers are generated and inserted into a portion of one or more fields of the video signal. The index numbers and other characters are generated in response to a clock signal, which in the present embodiment, is provided by synchronization signals extracted from the inputted video signal. The index numbers and other characters are advanced, decremented or otherwise modified in response to a control signal which is independent of the frame frequency (frames/sec) of the video signal. The control signal may originate from a variety of sources, such as by way of example, switching means operated by a user, an external computer, or a predetermined delay coupled to the synchronization signals. Accordingly, the identical index numbers as well as other characters may be inserted into a plurality of fields of the video signal without regard to the video signal's frame frequency standard.

In the preferred embodiment, colored areas as well as index numbers and other alphanumeric characters may be inserted into the video fields. In addition, characters and index numbers may also be encoded electronically into the signal (e.g. into standard SMPTE time code) such that they are invisible to a user, yet machine readable, by for example an appropriate time code reader.

A method for storing and displaying the formatted video information utilizing the present invention is also provided, which permits a user to view the data, one or more fields (one "page") at a time, each page being identified by a unique index number which has been inserted.

DETAILED DESCRIPTION OF THE INVENTION

Apparatus and methods for generating, inserting and displaying alphanumeric characters in a video signal, having particular application to electronic publishing systems is disclosed. In the following description for purposes of explanation, specific numbers, characters, formats, television standards, etc. are set forth in order to provide a thorough understanding of the present invention. However, it will be apparent to one skilled in the art that the present invention may be practiced without these specific details. In other instances, well-known circuits are shown in block diagram form in order not to obscure the present invention unnecessarily.

The present disclosure is based substantially in part on the Applicant's original disclosure in New Zealand Patent Application No. 199454, filed on Jan. 11, 1982, and incorporated by reference into this Specification as though fully set forth herein.

Figure 1:
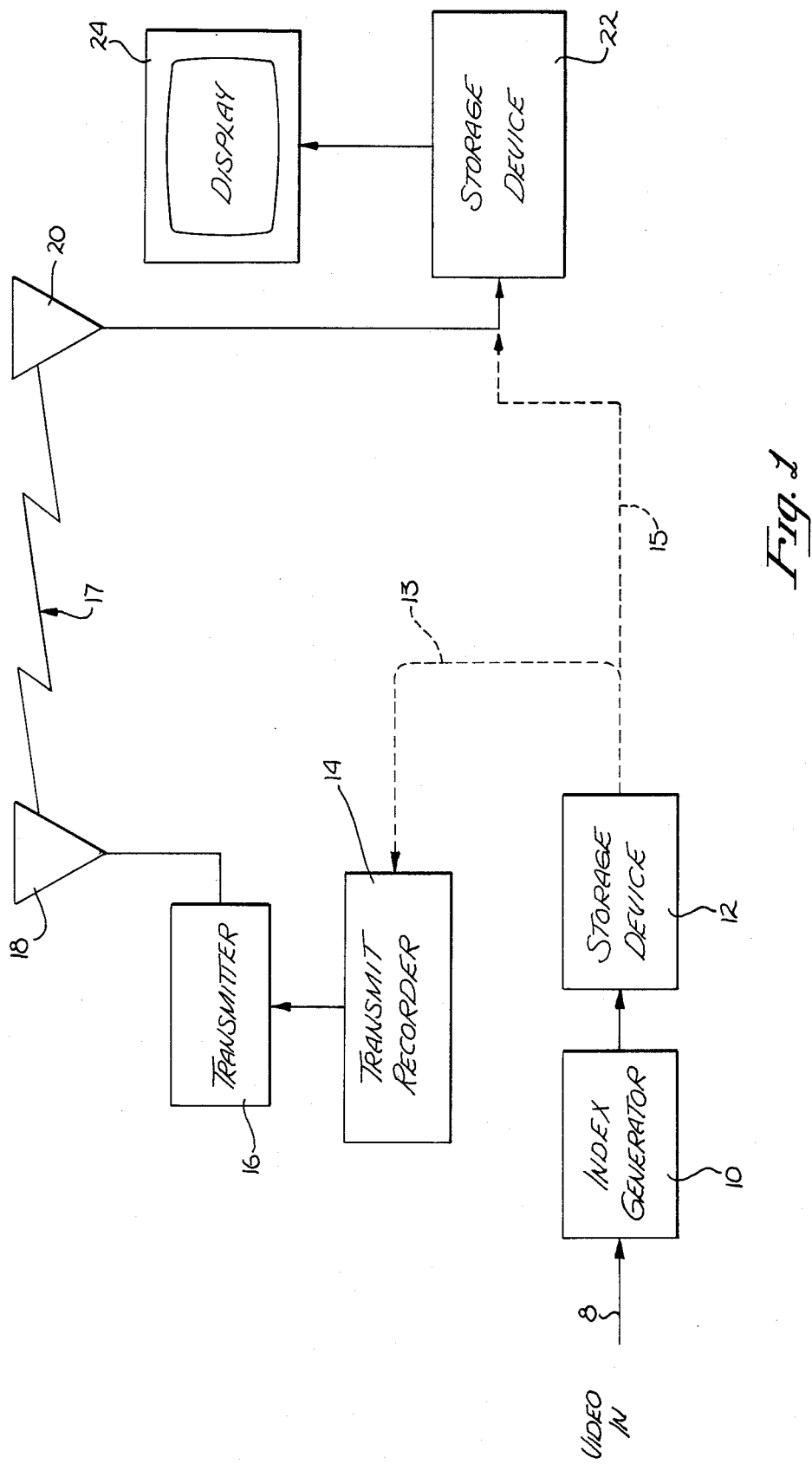
FIG. 1 is a block diagram of the electronic publishing system of the present invention.

Referring now to FIG. 1, a general block diagram of the television information transfer system utilized by the present invention is provided. Video information 8, which may include by way of example, photographic quality images as well as computer generated graphics, textural representations of current periodicals, novels, news service reports, and the like, is inputted into an index generator 10. Video information 8 may originate from a variety of sources, such as by way of illustration, film, video tape, or a direct coupling from a video camera. For purposes of this Specification, "video signal" is defined as the video, audio and other signals which comprise a typical television signal.

As will be described, index generator 10 formats the inputted video information by inserting unique index numbers into the video signal as desired. In addition, as will also be disclosed below, index generator 10 may also insert other alphanumeric characters ("alphanumeric characters" may comprise letters, numbers, symbols, logos, etc.) and colored areas into the video signal. In the presently preferred embodiment, the video signal inputted into index generator 10 comprises a plurality of video fields, where a "frame" of video information is defined as two fields.

In the United States, which uses the NTSC television standard, typically 30 frames (60 fields) of video information are transferred per second. However, in other countries such as New Zealand, which uses the PAL system, 25 frames (50 fields) are generally transmitted per second. These transmission rates are commonly referred to as the "frame frequency" of the video signal. For purposes of this Specification, the United States NTSC system will be used in describing the present invention. However, it will be appreciated that the present invention is directly adaptable to all television standards throughout the world, inasmuch as the present invention operates independently of the frame frequency. In addition, for purposes of this Specification, a "page" is generally defined as one or more frames of video information. However, it will be noted that a page may equally be defined as one or more video fields if the particular application of the present invention renders this desirable.

As illustrated in FIG. 1, index generator 10 is typically coupled to a storage device 12 which stores the newly formatted video information. Storage device 12 may take the form of, for example, a video tape recorder, an optical storage medium, or if the video signal is properly digitized, a digital memory. Storage device 12 is then typically coupled to a transmit recorder 14. Transmit recorder 14 is coupled to and feeds the formatted video information into a transmitter 16 for television transmission. In FIG. 1, the coupling between storage device 12 and transmit recorder 14 is shown by phantom line 13, in order to indicate that the coupling need not be direct. For example, storage device 12 may take the form of a video tape recorder in which the video tape storing the formatted video signal is physically transferred to a separate location where the transmit recorder 14 is situated. In addition, it will be appreciated that index generator 10 may be directly coupled to transmit recorder 14 without the need for storage device 12 if the particular application prefers such coupling. Moreover, it is possible to directly couple index generator 10 to transmitter 16 such that a direct transmission of the video signal immediately after its formatting by the index generator 10 is obtained.

The transmitted video signal 17 passes through a transmission medium, which by way of example, is shown as an electromagnetic transmission of signals through the atmosphere by antennae 18 in FIG. 1. It will be appreciated that the transmission medium may also comprise coaxial cable, optical fiber etc. Similarly, the transmitted video signal is received by a reception antennae and receiver 20, and the received signal is then coupled to a storage and readout device 22 for recording. As in the case of storage device 12, storage and readout device 22 may comprise a video tape recorder, recording disk, or the like. Storage and readout device 22 is capable of displaying individual pages of video information on a display 24. In the presently preferred embodiment, display 24 is a raster scan television receiver, however, display 24 may equally take the form of a vector or other display. Thus, a user desiring to view pages of the formatted video signal, may view the transferred information page by page. It will be noted, that the storage medium of storage device 12 may be physically transported to storage and readout device 22 as indicated by phantom line 15 in FIG. 1, thereby obviating the need for electromagnetic transmission and reception.

Figure 2:
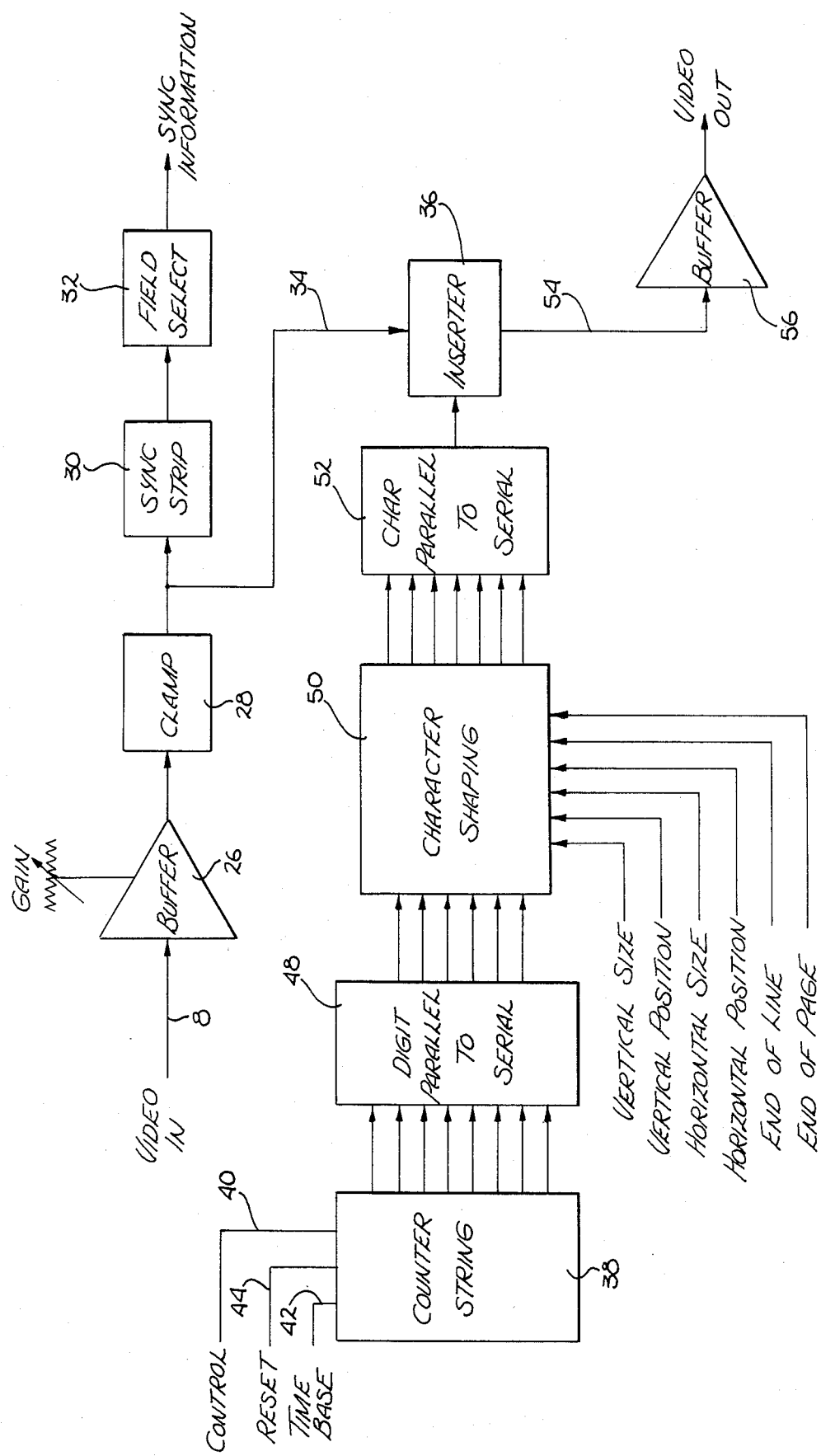
FIG. 2 is a schematic block diagram of the basic embodiment of the present invention.

Referring now to FIG. 2, the basic circuit configuration of index generator 10 for the insertion of index numbers into the inputted video signal will be described. Video information 8 to be formatted is inputted into index generator 10 and is coupled to a buffer 26 where it is gain and frequency equalized. In the present embodiment, buffer 26 comprises an LM318 high speed operational amplifier (op-amp). The buffered and gain equalized video signal is then coupled to a clamp circuit 28 where DC restoration takes place (presently an LM318 op-amp is used in conjunction with a CMOS transmission gate 4066). The video signal is then coupled to a synchronization stripper 30 in order to detect and isolate synchronization signals found within the inputted video signal. Synchronization signals isolated by the sync stripper 30 are then coupled to a field select circuit 32 which identifies frames, and outputs sync information in the form of one digital pulse per frame, thereby converting synchronization signals identifying video fields into pulses which identify video frames. This synchronization information is then coupled to other portions of the circuit as required and as is well known in the art.

The DC restored video input signal is coupled by line 34 to an inserter 36. As will be described, inserter 36 combines the inputted video signal on line 34 with the unique index numbers provided by the counter string 38. In order to generate the unique index numbers for insertion into the video signal, a counter string 38 is provided which comprises a binary coded decimal (BCD) counter. The counter string 38 provides eight BCD digits for insertion into the inputted video signal. Counter string 38 advances one count upon the receipt of a control signal 40. Similarly, counter string 38 provides an eight digit BCD output whenever clocked by an appropriate time base signal 42. Clocking time base signal 42 is provided such that counter string 38 develops an eight digit index number for every page of video information (each page in the presently preferred embodiment comprising one or more fields).

Thus, for every field of information passing through index generator 10, counter string 38 provides a desired index number for insertion into the field. A reset line 44 is provided in order to reset the counter string 38 to zero, or alternatively, the counters may be appropriately preset to a desired index number. Clocking time base signal 42 may originate from a variety of sources, however, in the presently preferred embodiment, clocking time base signal 42 is coupled to receive the synchronization information signals from the field select circuit 32, such that counter string 38 provides an index number for each frame of multiple thereof of video information passing through the index generator 10.

The control signal 40 for incrementing the index number generated by the counter string 38 may originate from switching means operated by user, an external computer, or as in the present embodiment, a predetermined delay selected by the user coupled to the synchronization information signals from the field select circuit 32. However, it will be appreciated that although the synchronization signals may be used in order to control the incrementing or decrementing of the counter string 38, that other sources may also provide the appropriate control signals 40.

As illustrated in FIG. 2, the output of the counter string 38 in the form of eight binary coded digits in parallel is coupled to a parallel to serial convertor 48. Parallel to serial convertor 48 outputs the eight digit index number generated by the counter string 38 in serial form to character shaping means 50. Character shaping means 50 utilizes a read-only memory (ROM) for character formation (part number 8678), as well as 16 to 1 multiplexers (part number 74150) in conjunction with a 74161 counter driving the multiplexers. Inasmuch as character shaping by providing the vertical size, vertical position, horizontal size and position and other information for insertion of the character into the video signal is well known, the structure and operation of the character shaping means 50 will not be further described in this Specification. The output of character shaping means 50 is coupled to a parallel to serial convertor 52 which outputs the generated index numbers in serial form to inserter 36. Inserter 36 then inserts the index number into the DC restored video signal for each field passing through the index generator 10, at the appropriate position in the video field in accordance with vertical size and position signals which are coupled to character shaping means 50.

The newly formatted video signal including the inserted unique index number is coupled to line 54 and to buffer 56 and is then outputted to storage device 12 or the like. It will be appreciated that the particular index number generated by counter string 38 for insertion into video fields is not dependent on the synchronization signals of the inputted video signal. Thus, a particular index number may be inserted into a plurality of video fields as desired, based on the content of the video frames and independent of the time coding of the video signal. This feature of the present invention permits a unique index number to be associated with multiple fields of video information subsequently displayed on display 24 by a user.

Figure 3:
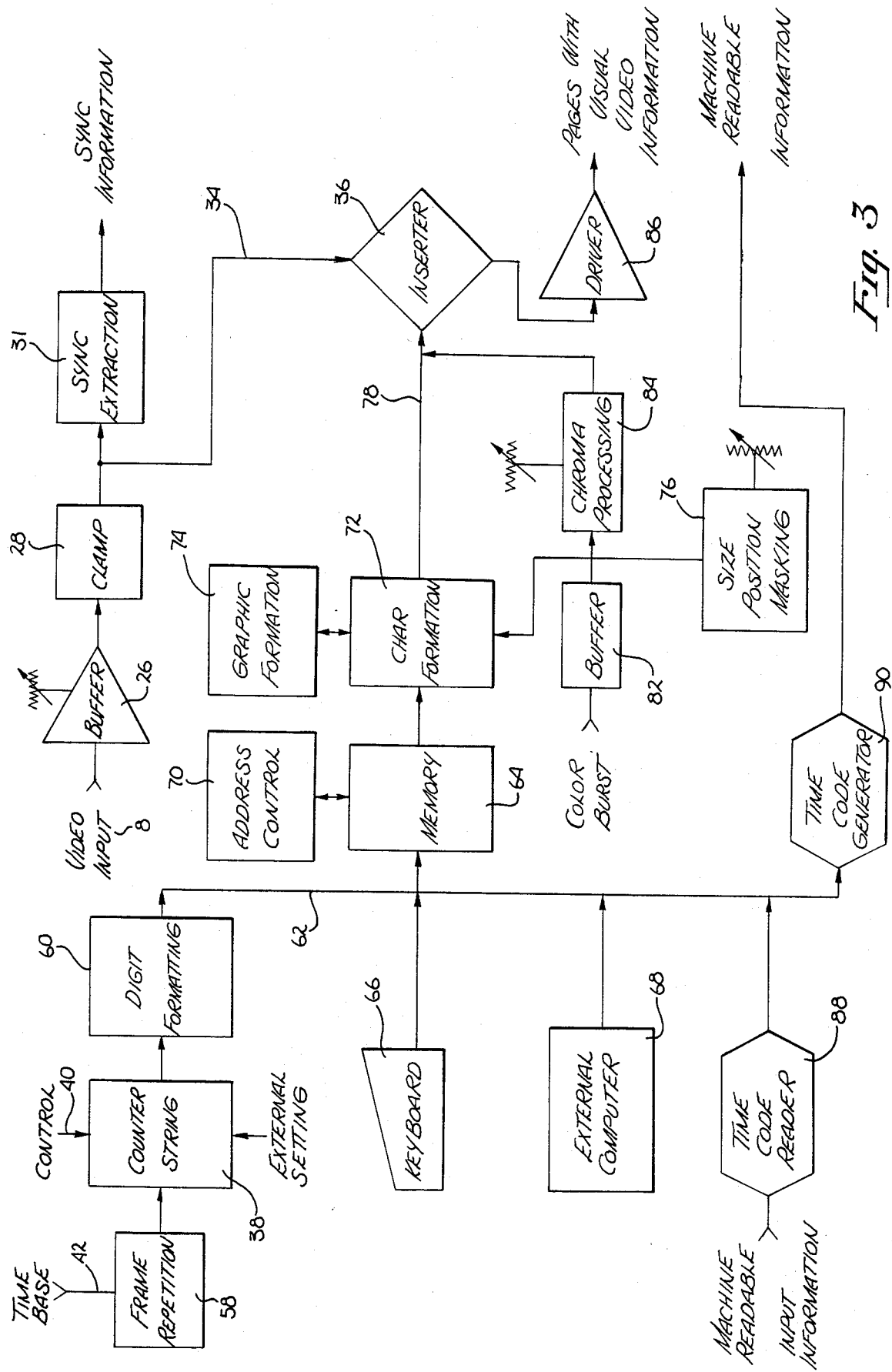
FIG. 3 is a schematic block diagram of the presently preferred embodiment of the present invention.

Referring now to FIG. 3, the presently preferred embodiment of the invention will be described. The preferred embodiment of the invention incorporates the features of the basic index number generator described in conjunction with FIG. 2, but further permits the user to input other alphanumeric characters in addition to the index number as well as colored areas such as borders and backgrounds into the inputted video signal. It will be noted that since many of the components of the embodiment of FIG. 3 correspond to those previously described in FIG. 2, unless some modification exists in a particular component, similar numerals will be used to designate the FIG. 3 components.

The video signal 8 is inputted into buffer 26 for gain equalization and is then coupled to clamp 28. Sync extraction block 31 comprises sync stripper 30 and field select circuit 32 previously discussed with reference to FIG. 2. The DC restored video signal is coupled from clamp 28 to line 34 and to inserter 36. Counter string 38, for providing an index number for insertion into the video signal, is coupled to frame repetition circuit 58. Frame repetition circuit 58 provides a clocking signal to counter string 38 in response to clocking time base signal 42. Frame repetition circuit 58 permits the user to vary the clocking time base signal 42 which may be directly coupled to synchronization signals provided by the sync extraction block 31. Accordingly, frame repetition circuit 58 may comprise a series of variable delay elements such that counter string 38 provides an index number for insertion into the video signal only after a preselected number of fields have passed through the inserter 36. Alternatively, frame repetition circuit 58 may provide clocking signals to counter string 38 such that multiple index generation numbers are provided for each field of video information passing through the index generator 10.

Control signal 40 for incrementing or decrementing the counter string 38 may be provided by user controlled switching means, an external computer, or sufficiently delayed signal synchronization means from sync extraction block 31. The index number generated by counter string 38 is coupled to the digit formatting circuit 60 which includes digital parallel to serial converter 48 in order to output the current index number in serial form onto a bus 62. Digit formating circuit 60 further provides appropriate timing for coupling the generated index number to a random access memory 64 through bus 62. Other alphanumeric characters such as for example dates, titles, names, etc. may be generated by external keyboard 66 and/or external computer 68. Other possible inputs of alphanumeric characters, by way of example, would include word processing equipment as well as satellite links from remote locations. These alphanumeric characters are also coupled to memory 64 on bus 62.

The alphanumeric characters and index numbers are stored in memory 64 for insertion into the video fields of the inputted video signal. Address control circuit 70 allocates storage within memory 64 and provides appropriate addressing in order to access the inputted alphanumeric and index number characters, as is well-known in the art.

Memory 64 is coupled to character formation circuit 72 which generates a video rate signal to be inserted into the inputted video signal. Optional graphic manipulation of the inputted alphanumeric and other characters may be performed by a graphic formation circuit 74, such as providing a particular font style for the characters and/or numbers to be inserted. In addition, size, position and masking circuits 76 are coupled to the character formation circuit 72 in order to provide information to the character formation circuit as to the vertical and horizontal size and position of the characters to be inserted in the video field. For example, the masking or removal of superfluous leading zeros in the index number and other characters may be accomplished using well-known circuits. The alphanumeric characters and index numbers to be inserted into the video signal are coupled to the inserter 36 on line 78.

In addition to the insertion of alphanumeric characters and/or index numbers, the present invention also provides for the insertion of colored areas such as strips, borders, etc. into the video signal. An external or internally extracted color burst signal 80 is coupled to a buffer 82 and chroma processing circuit 84. The chroma processing circuit, as is well known, allows control of chroma level, phase and luminescence as well as positioning of borders and the like if desired. The color signal is then coupled to the inserter 36 for insertion in the video signal.

Inserter 36 inserts alphanumeric characters provided by the character formation circuit and color signals at the appropriate position within video fields which comprise the inputted video signal. The modified and now formatted video signal is coupled from the inserter 36 to a driver 86, and comprises video pages with index numbers and other alphanumeric characters and/or colored areas inserted into the video signal. Thus, information such as unique index numbers, the names and dates of publications or the like, as well as colors and other alphanumeric information, may be inserted into a plurality of fields of the video signal independent of the frame frequency of the video signal.

In some applications, it may be desirable to provide the index numbers and/or other alphanumeric information in a machine readable form. Thus, the inserted data need not be visible to a user displaying the pages of video information in the raster scan display 29. Although index generator 10 inserts information into the video fields independently of the frame frequency of the video signal, the embodiment disclosed in FIG. 3 permits the encoding of index numbers and other alphanumeric information into, for example, the SMPTE time code, which is typically recorded on the audio track of the video tape or in the vertical interval of the video signal, and provides 32 spare unused user bits in the address section of the code. The code is repeated at a rate compatible with the video frame frequency, and is completely self-contained and self-clocking. As shown in FIG. 3, machine readable information, for example the audio portion of the video input signal, is coupled to a time code reader 88 which reads the SMPTE time code and isolates the contents of the user bits. Inasmuch as the specific operation of the video time code reader is very well known in the art, it will not be recited herein. Alphanumeric characters and index numbers for a page of video information are coupled on bus 62 to time code generator 90 which encodes the desired alphanumeric characters and the like into the addresses corresponding to the unused user bits of the SMPTE code. Once encoded, the machine readable code is then passed to the video tape (e.g., the audio portion of the tape or the vertical interval) and is coupled to storage device 12 or the like. The use of a machine readable index code for each frame or field of video information permits storage and readout device 22, with appropriate circuitry, to access any portion of the stored video signal by appropriate reading, scanning and accessing of the stored code. For example, a storage device, such as for example a video cassette recorder, with the ability to read SMPTE code may be programmed to scan or "go to" a particular index number encoded in the code, and display the page to which the index number corresponds.

Figure 4:
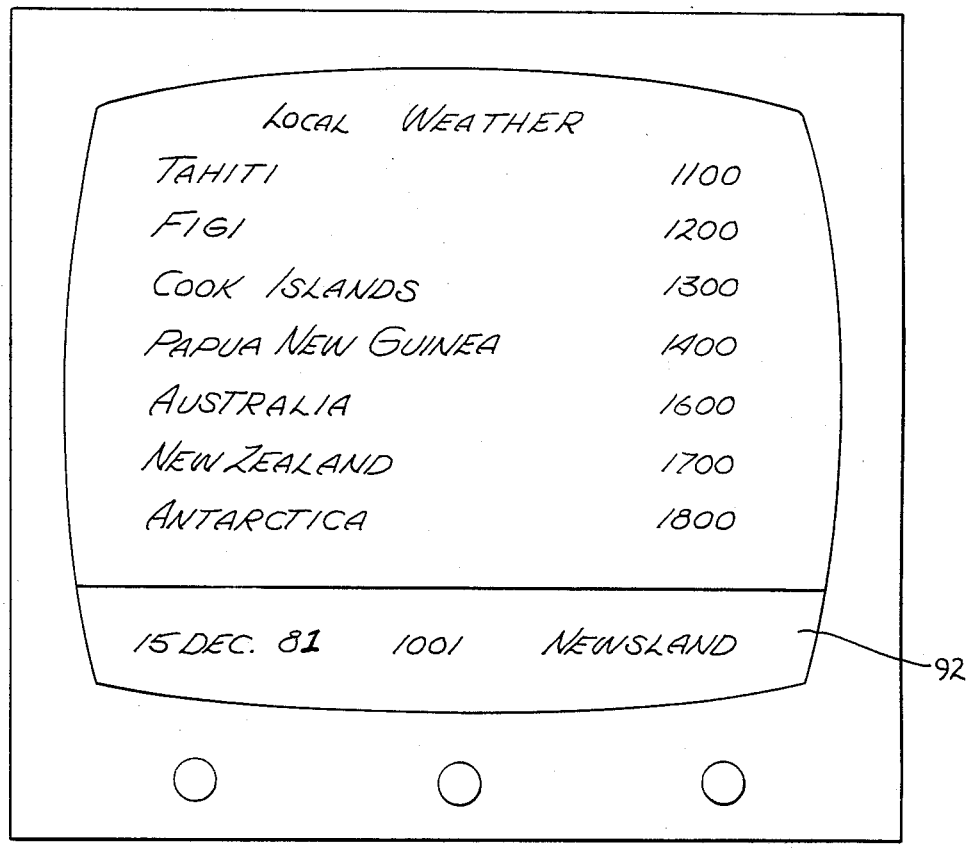
FIG. 4 is a diagramatical illustration of an example of the video output provided by the present invention.

Referring now to FIG. 4, an example of the output of index generator 10 when displayed on display 29 is illustrated. In the example provided, index generator 10 has inserted a unique index number "1001" into the lower center portion of the video image. In addition, the date of "15 Dec. 81" has been inserted using external keyboard 66 or the like into the lower left portion of the video image. Moreover, the name of the publication "Newsland" has been inserted using keyboard 66 or the like into the lower right portion of the video image. The inserted alphanumeric information is delineated by a colored border 92 or the like by providing an appropriate color burst 80 and processing 84 to inserter 36. It will be apparent to one skilled in the art that a user obtaining electronic information may access such information on a page by page basis by sequentially displaying each video page as he desires. If the embodiment of FIG. 3 is utilized such that the system includes index numbers in machine readable form, the user may directly access any index numbered page by appropriate programming of storage and readout device 22.

In practice, video information in the form of a plurality of pictorial and textual pages of periodical information (e.g., magazine pages) is formatted in accordance with the provisions of the present invention, such that each page of video information may comprise a plurality of video fields being identified by a single index number. The formatted video information is then transmitted to storage and readout device 22 where a user may sequentially view each page of video information on display 29. Many thousands of pages of video information may be transmitted and stored by storage and readout device 22 within minutes using a "batch" type delivery, yet viewed by the user on display 29 at his convenience by simply incrementing or decrementing pages as he desires.

Thus, methods and apparatus have been disclosed which have particular application to electronic publishing. The present invention provides a formatted video signal which when stored and appropriately displayed permits a user to view pictorial and textual material using a standard television system technology.

We claim:

1. An apparatus for generating and inserting additional video information into a video signal, said video signal including a plurality of fields of video information, each of said fields identified by a pre-existing, predetermined code, said pre-existing code located in a non-visible portion of each of said fields, said pre-existing code comprised of a plurality of bits, a portion of said bits being user definable comprising:

video means for inputting said video signal;

character generation means for generating desired alphanumeric characters for insertion into at least one field of said video signal;

encoding means coupled to said character generation means for encoding data representative of said alphanumeric character into said user definable bits of said predetermined code for said field;

clocking means coupled to said character generation means for signalling said character generation means to generate said alphanumeric character for encoding into said user definable bits of said predetermined code independent of said video signal's frame frequency;

whereby said alphanumeric character may be encoded into a plurality of codes identifying a plurality of fields, independent of said video signal's frame frequency.

2. The apparatus as defined by claim 1 further including inserter means for inserting said alphanumeric character into a visible portion of said video signal field such that said character is visible when said signal is coupled to a display.

3. The apparatus as defined by claim 2 further including color generation means coupled to said inserter means for providing a colored area surrounding said alphanumeric character in said visible portion of said field.

4. The apparatus as defined by claim 3, wherein said character generation means includes memory means for storing alphanumeric characters to be displayed in said visible portion of said signal field;

character formation means coupled to said memory means for providing said alphanumeric character in serial form to said inserter means.

5. The apparatus as defined by claim 4 wherein said character generation means further includes counting means coupled to said memory means for providing a numeric character for insertion into said video signal, said counting means advancing said character by a predetermined value on receipt of a control signal.

6. The apparatus as defined by claim 4 wherein said character generation means further includes character input means coupled to said memory means for providing an alphanumeric character for insertion into said video signal.

7. The apparatus as defined by claim 5 wherein said video input means includes synchronization means for providing synchronization signals defining fields of said video signal.

8. The apparatus as defined by claim 7 wherein said synchronization signals are coupled to said clocking means, such that said clocking means provides signals to said character generation means as a selected function of the rate of said synchronization signals.

9. An improved method for formatting video information to be electronically disseminated in an electronic publishing system, said publishing system including first storage means for storing said formatted video information and display means for displaying said video information comprising the steps of:

providing a video signal comprising a plurality of fields to be displayed on said display means;

providing alphanumeric characters to be inserted into said video signal;

inserting said alphanumeric characters into said fields, such that the same alphanumeric character can selectively be inserted into a plurality of fields independent of said video signal's frame frequency;

transmitting said formatted video information to said first storage means;

storing said formatted video information in said first storage means, for selectively displaying at least one field at a time on said display means;

whereby said video information is formatted such that said fields correspond to unique alphanumeric characters.

10. The method as defined by claim 9 wherein said formatted video information is stored in a second storage means prior to said transmitting step.

11. The method as defined by claim 9 wherein said insertion step includes encoding said alphanumeric character into a predetermined code identifying each of said fields of said video information, such that said character is encoded into the audio portion of said video signal not visible on said display.

12. The method as defined by claim 9 wherein said insertion step includes encoding said alphanumeric character into a predetermined code identifying each of said fields of said video information, such that said character is inserted into the vertical interval portion of said video signal.

13. The method as defined by claim 9 wherein said storage means comprises a video recorder capable of displaying individual frames of said video information.

14. The method as defined by claim 9 wherein said insertion step inserts said alphanumeric characters into a portion of said video signal visible on said display.

* * * * *